United States Patent
Chang et al.

(10) Patent No.: US 7,203,461 B2
(45) Date of Patent: Apr. 10, 2007

(54) ADAPTIVE CHANNEL QUALITY ESTIMATION ALGORITHM TO SUPPORT LINK ADAPTATION

(75) Inventors: Li Fung Chang, Holmdel, NJ (US); Yongqian Wang, Woodbridge, NJ (US); Xiaoxin Qiu, Bridgewater, NJ (US); Nelson R. Sollenberger, Farmingdale, NJ (US)

(73) Assignee: Broadcom Corporation, Irvine, CA (US)

( * ) Notice: Subject to any disclaimer, the term of this patent is extended or adjusted under 35 U.S.C. 154(b) by 523 days.

(21) Appl. No.: 10/845,955

(22) Filed: May 14, 2004

(65) Prior Publication Data
US 2004/0253968 A1 Dec. 16, 2004

Related U.S. Application Data

(60) Provisional application No. 60/478,922, filed on Jun. 16, 2003.

(51) Int. Cl.
*H04B 17/00* (2006.01)
(52) U.S. Cl. ............... 455/67.13; 455/63.1; 455/67.11; 455/69; 455/452.2; 455/522; 455/277.2; 370/252; 370/328; 375/264; 375/265; 342/387
(58) Field of Classification Search ............... 455/63.1, 455/67.11, 522, 67.13, 277.2, 69, 452.2; 375/264
See application file for complete search history.

(56) References Cited

U.S. PATENT DOCUMENTS 6,169,763 B1 * 1/2001 Woodward et al. ......... 375/224
6,208,663 B1 * 3/2001 Schramm et al. ........... 370/465
6,400,928 B1 * 6/2002 Khullar et al. ............ 455/67.11
6,427,219 B1 * 7/2002 Yang .......................... 714/758
6,542,490 B1 * 4/2003 Ahmadvand et al. ....... 370/338
6,631,127 B1 * 10/2003 Ahmed et al. .............. 370/349
6,694,135 B1 * 2/2004 Oksala et al. ............... 455/424
6,741,658 B1 * 5/2004 Ionescu ....................... 375/267

FOREIGN PATENT DOCUMENTS

| EP | 1 033 852 A1 | 2/1999 |
|---|---|---|
| WO | WO 00/69023 | 11/2000 |
| WO | WO 01/33792 A1 | 5/2001 |

\* cited by examiner

*Primary Examiner*—Marceau Milord
(74) *Attorney, Agent, or Firm*—Garlick Harrison Markison; Robert McLauchlan

(57) ABSTRACT

RF communications received by a wireless terminal from a servicing base station are used to determine the channel quality such as reported bit error probability (BEP). The RF communications may be in the form of RF bursts that are part of a data frame. An estimated BEP may be determined from the signal to noise ratio (SNR) of the RF bursts and or a sequence of soft decisions extracted from the RF bursts, and their historical performance. The SNR maps to an estimated BEP based upon the modulation format of the RF bursts. The soft decisions decode to produce a data block. When the soft decisions decoded favorably, the re-encoded data block produces a sequence of re-encoded decisions. Comparing the re-encoded decisions to the soft decisions yields a re-encoded bit error (RBER). The reported BEP may be based upon the estimated BEP, RBER, and/or RBER threshold. The RBER threshold may be adaptively incremented or decremented depending upon whether or not the RF communications were properly decoded. The size of the increment or decrement may be based on the channel quality.

36 Claims, 11 Drawing Sheets

ADAPTIVE CHANNEL QUALITY ESTIMATION ALGORITHM TO SUPPORT LINK ADAPTATION

CROSS REFERENCES TO RELATED APPLICATIONS

This application claims priority to U.S. Provisional Patent Application Ser. No. 60/478,922, filed Jun. 16, 2003, which is incorporated herein by reference for all purposes.

BACKGROUND

1. Technical Field

The present invention relates generally to cellular wireless communication systems, and more particularly to the determination of a bit error probability of radio frequency communications received by a wireless terminal within a cellular wireless communication system.

2. Related Art

Cellular wireless communication systems support wireless communication services in many populated areas of the world. While cellular wireless communication systems were initially constructed to service voice communications, they are now called upon to support data communications as well. The demand for data communication services has exploded with the acceptance and widespread use of the Internet. While data communications have historically been serviced via wired connections, cellular wireless users now demand that their wireless units also support data communications. Many wireless subscribers now expect to be able to "surf" the Internet, access their email, and perform other data communication activities using their cellular phones, wireless personal data assistants, wirelessly linked notebook computers, and/or other wireless devices. The demand for wireless communication system data communications will only increase with time. Thus, cellular wireless communication systems are currently being created/modified to service these burgeoning data communication demands.

Cellular wireless networks include a "network infrastructure" that wirelessly communicates with wireless terminals within a respective service coverage area. The network infrastructure typically includes a plurality of base stations dispersed throughout the service coverage area, each of which supports wireless communications within a respective cell (or set of sectors). The base stations couple to base station controllers (BSCs), with each BSC serving a plurality of base stations. Each BSC couples to a mobile switching center (MSC). Each BSC also typically directly or indirectly couples to the Internet.

In operation, each base station communicates with a plurality of wireless terminals operating in its cell/sectors. A BSC coupled to the base station routes voice communications between the MSC and a serving base station. The MSC routes voice communications to another MSC or to the PSTN. Typically, BSCs route data communications between a servicing base station and a packet data network that may include or couple to the Internet. Transmissions from base stations to wireless terminals are referred to as "forward link" transmissions while transmissions from wireless terminals to base stations are referred to as "reverse link" transmissions. The volume of data transmitted on the forward link typically exceeds the volume of data transmitted on the reverse link. Such is the case because data users typically issue commands to request data from data sources, e.g., web servers, and the web servers provide the data to the wireless terminals. The great number of wireless terminals communicating with a single base station forces the need to divide the forward and reverse link transmission times amongst the various wireless terminals.

Wireless links between base stations and their serviced wireless terminals typically operate according to one (or more) of a plurality of operating standards. These operating standards define the manner in which the wireless link may be allocated, setup, serviced and torn down. One popular cellular standard is the Global System for Mobile telecommunications (GSM) standard. The GSM standard, or simply GSM, is predominant in Europe and is in use around the globe. While GSM originally serviced only voice communications, it has been modified to also service data communications. GSM General Packet Radio Service (GPRS) operations and the Enhanced Data rates for GSM (or Global) Evolution (EDGE) operations coexist with GSM by sharing the channel bandwidth, slot structure, and slot timing of the GSM standard. GPRS operations and EDGE operations may also serve as migration paths for other standards as well, e.g., IS-136 and Pacific Digital Cellular (PDC).

The GSM standard specifies communications in a time divided format (in multiple channels). The GSM standard specifies a 4.615 ms frame that includes 8 slots of, each including eight slots of approximately 577 µs in duration. Each slot corresponds to a Radio Frequency (RF) burst. A normal RF burst, used to transmit information, typically includes a left side, a midamble, and a right side. The midamble typically contains a training sequence whose exact configuration depends on modulation format used. However, other types of RF bursts are known to those skilled in the art. Each set of four bursts on the forward link carry a partial link layer data block, a full link layer data block, or multiple link layer data blocks. Also included in these four bursts is control information intended for not only the wireless terminal for which the data block is intended but for other wireless terminals as well.

GPRS and EDGE include multiple coding/puncturing schemes and multiple modulation formats, e.g., Gaussian Minimum Shift Keying (GMSK) modulation or Eight Phase Shift Keying (8PSK) modulation. Particular coding/puncturing schemes and modulation formats used at any time depend upon the quality of a servicing forward link channel, e.g., Signal-to-Noise-Ratio (SNR) or Signal-to-Interference-Ratio (SIR) of the channel, Bit Error Rate of the channel, Block Error Rate of the channel, etc. As multiple modulation formats may be used for any RF burst, wireless communication systems need the ability to determine which coding scheme and modulation format will result in the successful receipt and demodulation of the information contained within the RF bursts. This decision may be further influenced by changing radio conditions and the desired quality level to be associated with the communications.

Link adaptation (LA) is a mechanism used to adapt the channel coding schemes and modulation formats to the changing radio link conditions. LA allows the network to command the handset to change to the modulation and coding scheme that is best for the current radio condition while providing a desired level of quality associated with the communications. To facilitate the network to do so, the handset reports a downlink quality report or quality measure to the network via the servicing base station.

Key challenges in LA are the algorithm used in the network for link adaptation control, and the accuracy of the downlink quality reports that measure the changing radio conditions. In general, the actual channel quality of the changing radio conditions may be represented measures such as the Bit Error Rate (BER) or Block Error Rate (BLER). However, exact BER evaluation is often intractable or numerically cumbersome. Therefore, approximations of the channel quality are sought. Such approximations may be referred to as the Bit Error Probability (BEP). The quality reported to the network and calculated by the handset are the long-term average and standard deviation of the BEP.

The long-term average BEP is obtained from the current BEP corresponding to the current received data block. There are several ways to derive the current BEP. For example, the BEP can be derived based on: (1) signal-to-noise ratio (SNR); (2) re-encoding correctly decoded data; or (3) the training sequence. SNR-based BEP requires robust SNR-to-BEP mapping table that covers all types of propagation environments. SNR based approximations often overestimate system performance. This over estimation of system performance can result in optimistic BEPs being used to make LA decisions. LA decisions based upon optimistic BEP can result in lost communications between the wireless terminal and the servicing base station. Furthermore, extensive computer simulations are therefore needed to generate this mapping table.

RBER count provides a better measurement for the current link quality regardless of the radio propagation environments. Thus re-encoding based BEP can better reflect the link quality; however, this value is available only if the data block is decoded correctly. Training sequence based BEP calculation can be easily obtained but it does not provide enough samples (26 for GMSK, 78 for 8PSK) for BEP averaging. Therefore there is a need to determine for more accurate BEP in the LA process.

BRIEF SUMMARY OF THE INVENTION

In order to overcome the shortcomings of prior devices, the present invention provides a system and method to determine or estimate the channel quality with measures such as the bit error probability (BEP) of a received radio frequency (RF) bursts within a data frame that substantially addresses the above identified needs. The present invention offers algorithms that provide better results by deriving the BEP based on both: (1) signal-to-noise ratio (SNR); and (2) re-encoding correctly decoded data. More specifically, one embodiment of the present invention provides a method of processing RF bursts within a wireless terminal in order to facilitate link adaptation with a determined channel quality. The channel quality (corresponding to a measured or reported BEP) reported by the terminal is then used by the network to adaptively select the modulation format and coding scheme of the RF bursts. The RF bursts received by the terminal are processed to produce a data block, which is decoded. The decoded data block is examined to determine if the data block decode was successful. When the decoding is unsuccessful the reported BEP is set to the maximum of a measured quality report, and a quality report threshold. Then the quality report threshold is incremented. When the decoding is successful, the reported BEP is set to the measured quality report. Then the quality report threshold is reduced by a decrement step size. Note that either BEP increment or decrement are bounded by upper and lower BEP bounds. Thus, they can not be reduced or increased infinitely.

The measured quality report for the data block may be determined from the re-encode bit error count, signal to noise ratio (SNR) of the RF bursts, or from training sequences within the RF bursts, or a block error rate (BLER). In some embodiments the measure quality report may be a BEP. Typically, the SNR is derived from the training sequences within the RF bursts and the SNR maps to an estimated BEP based upon the modulation format of the RF bursts. Soft decisions within the RF bursts may be extracted from the data bits within the RF bursts. When sequences of soft decisions decoded favorably the data block is re-encoded to produce a sequence of re-encoded decisions. Comparing the sequence of re-encoded decisions to the sequence of soft decisions yields a re-encoded bit error (RBER). Some embodiments use the estimated BEP to calculate the measured BEP when decoding was unsuccessful. Other embodiments rely only on the RBER. However, both the estimated BEP and RBER or BLER may be used to determine the BEP. Furthermore, this measured quality report or BEP may be determined based upon the data block derived from the current associated 4 RF bursts and previous data blocks derived from previous 4 RF bursts.

Another embodiment of the present invention provides a wireless terminal having a radio frequency (RF) front end, a base band processor communicatively coupled to the RF front end, and an optional enCOder/DECoder (CODEC) processing module which if present is communicatively coupled to the base band processor. The combination of the RF front end, base band processor, and the CODEC processing module (if present) operate to receive and process RF bursts from the servicing base station. The combination receives RF bursts transmitted according to a transmission scheme wherein the transmission scheme includes both a modulation format and a coding format. Additionally, the combination forms a data block from the received RF bursts and then attempts to decode the data block. The combination determines whether the decoding of the data block was successful and uses this information to help determined the reported BEP for the data block. When the decoding is unsuccessful the reported BEP is set to the maximum of a measured quality report, and a quality report threshold. Then the quality report threshold is incremented. In some instances, this corresponds to a BEP threshold. When the decoding is successful, the reported BEP is set to the measured quality report. Then the quality report threshold is reduced by a decrement step size.

This measured quality report or BEP may be determined in a manner similar to that of the previously described embodiment. The measured BEP may rely on both the current data block and previous data blocks. Furthermore, the measured BEP may be based upon the average SNR of the RF bursts when the data block decodes unsuccessfully and/or the RBER when the data block decodes successfully. Some embodiments use only the estimated BEP to calculate the measured BEP when decoding was unsuccessful. Other embodiments rely only on the RBER. However, both the estimated BEP and RBER may be used to determine the measured BEP.

In summary, the quality report first use an estimated BEP based on the average SNR of the 4 RF bursts, BEP threshold that is adaptively changed based on the decoding status, and the RBER of the RF bursts as the quality indication of the current received RLC block. This is coupled with a predetermined quality report threshold, which is either incremented or decremented depending on the decoding status of the received RLC block. The quality is reported to the network when it is requested through signaling control messages.

Other features and advantages of the present invention will become apparent from the following detailed description of the invention made with reference to the accompanying drawings.

DETAILED DESCRIPTION OF THE DRAWINGS

Figure 1:
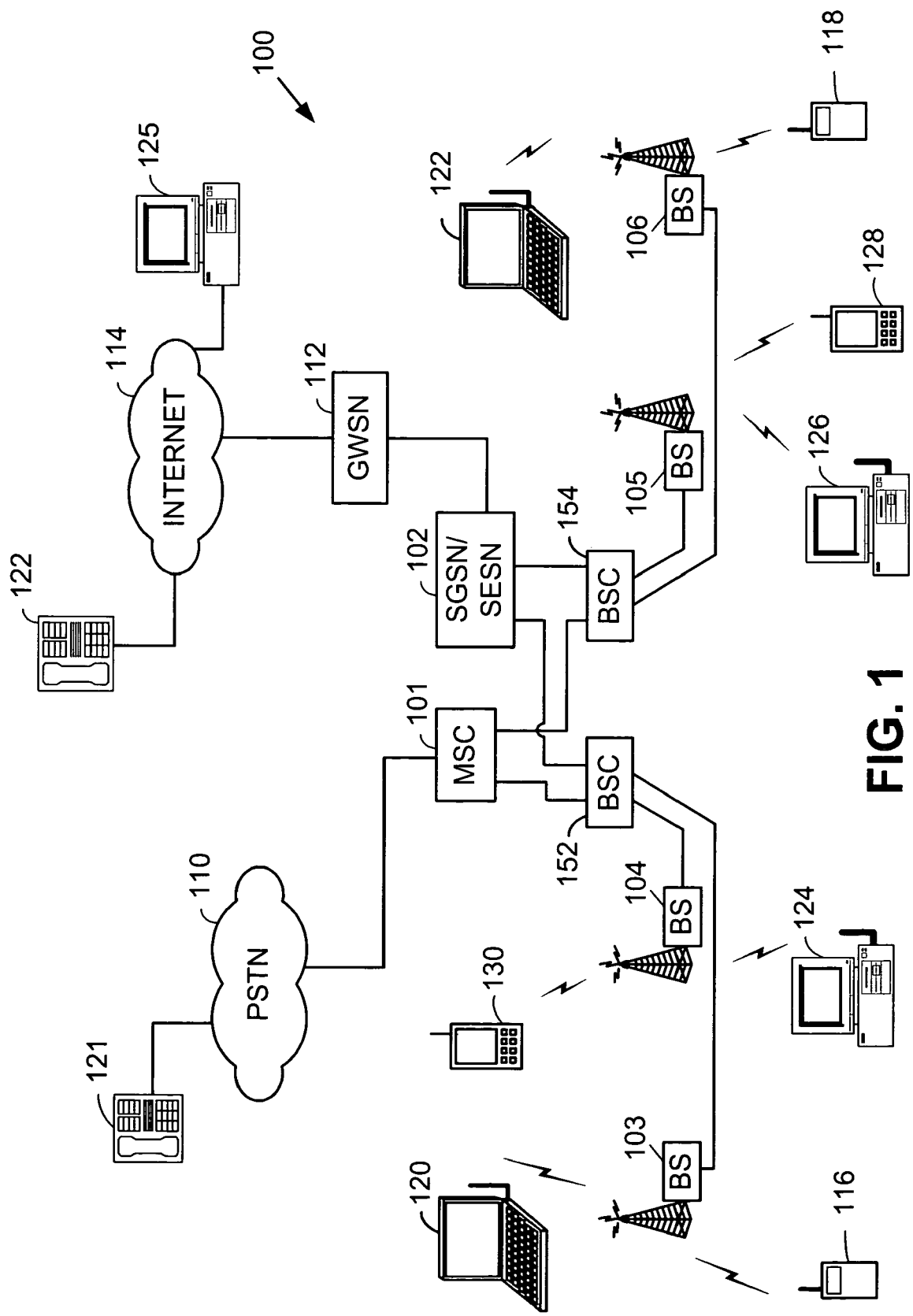
FIG. 1 is a system diagram illustrating a portion of a cellular wireless communication system that supports wireless terminals operating according to the present invention.

FIG. 1 is a system diagram illustrating a portion of a cellular wireless communication system 100 that supports wireless terminals operating according to the present invention. The cellular wireless communication system 100 includes a Mobile Switching Center (MSC) 101, Serving GPRS Support Node/Serving EDGE Support Node (SGSN/SESN) 102, base station controllers (BSCs) 152 and 154, and base stations 103, 104, 105, and 106. The SGSN/SESN 102 couples to the Internet 114 via a GPRS Gateway Support Node (GGSN) 112. A conventional voice terminal 121 couples to the PSTN 110. A Voice over Internet Protocol (VoIP) terminal 123 and a personal computer 125 couple to the Internet 114. The MSC 101 couples to the Public Switched Telephone Network (PSTN) 110.

Each of the base stations 103–106 services a cell/set of sectors within which it supports wireless communications. Wireless links that include both forward link components and reverse link components support wireless communications between the base stations and their serviced wireless terminals. These wireless links support digital data communications, VoIP communications, and other digital multimedia communications. The cellular wireless communication system 100 may also be backward compatible in supporting analog operations as well. The cellular wireless communication system 100 supports the Global System for Mobile telecommunications (GSM) standard and also the Enhanced Data rates for GSM (or Global) Evolution (EDGE) extension thereof. The cellular wireless communication system 100 may also support the GSM General Packet Radio Service (GPRS) extension to GSM. However, the present invention is also applicable to other standards as well, e.g., TDMA standards, CDMA standards, etc. In general, the teachings of the present invention apply to digital communications that apply dynamic link adaptation (LA) of the Modulation and Coding schemes (MCSS) utilized for communications between wireless terminals and servicing base stations.

Wireless terminals 116, 118, 120, 122, 124, 126, 128, and 130 couple to the cellular wireless communication system 100 via wireless links with the base stations 103–106. As illustrated, wireless terminals may include cellular telephones 116 and 118, laptop computers 120 and 122, desktop computers 124 and 126, and data terminals 128 and 130. However, the wireless system supports communications with other types of wireless terminals as known to those skilled in the art as well. As is generally known, devices such as laptop computers 120 and 122, desktop computers 124 and 126, data terminals 128 and 130, and cellular telephones 116 and 118, are enabled to "surf" the Internet 114, transmit and receive data communications such as email, transmit and receive files, and to perform other data operations. Many of these data operations have significant download data-rate (forward link) requirements while the upload data-rate (reverse link) requirements are not as severe. Some or all of the wireless terminals 116–130 are therefore enabled to support the EDGE operating standard. These wireless terminals 116–130 also support the GSM standard and may support the GPRS standard. Wireless terminals 116–130 support the LA decision making process by determining the bit error probability (BEP) of received radio frequency (RF) communications received from by base stations 103–106 and reporting this BEP to the wireless communication system 100. Link adaptation systems (LAS) 153, shown operable coupled to BSC 152 and 154, use provided BEP and BLER information contained within a downlink quality report to select an appropriate MCS (transmission scheme). In many cases, the BLER provides more objective data when compared to that of the BEP. The BLER is an important indicator of link quality because the BLER may comprise or be derived from a bitmap that indicates which segments of the RF transmissions were requested to be retransmitted. Although LAS is shown operable coupled to the BSCs, the LAS may be operable coupled to BSs 103–106. The wireless communication system 100 then uses the provided information to select an appropriate MCS.

Wireless terminals 116–130 support the pipelined processing of received RF bursts in slots of a GSM frame so that a plurality of slots in each sub-frame of a GSM frame are allocated for forward link transmissions to a single wireless terminal. In one embodiment, a number of slots of a GSM frame are allocated for forward link transmissions to a wireless terminal such that the wireless terminal must receive and process a number of RF bursts, e.g., 2, 3, 4, or more RF bursts, in each GSM frame. The wireless terminal is able to process the RF bursts contained in these slots and still service reverse link transmissions and the other processing requirements of the wireless terminal.

Figure 2:
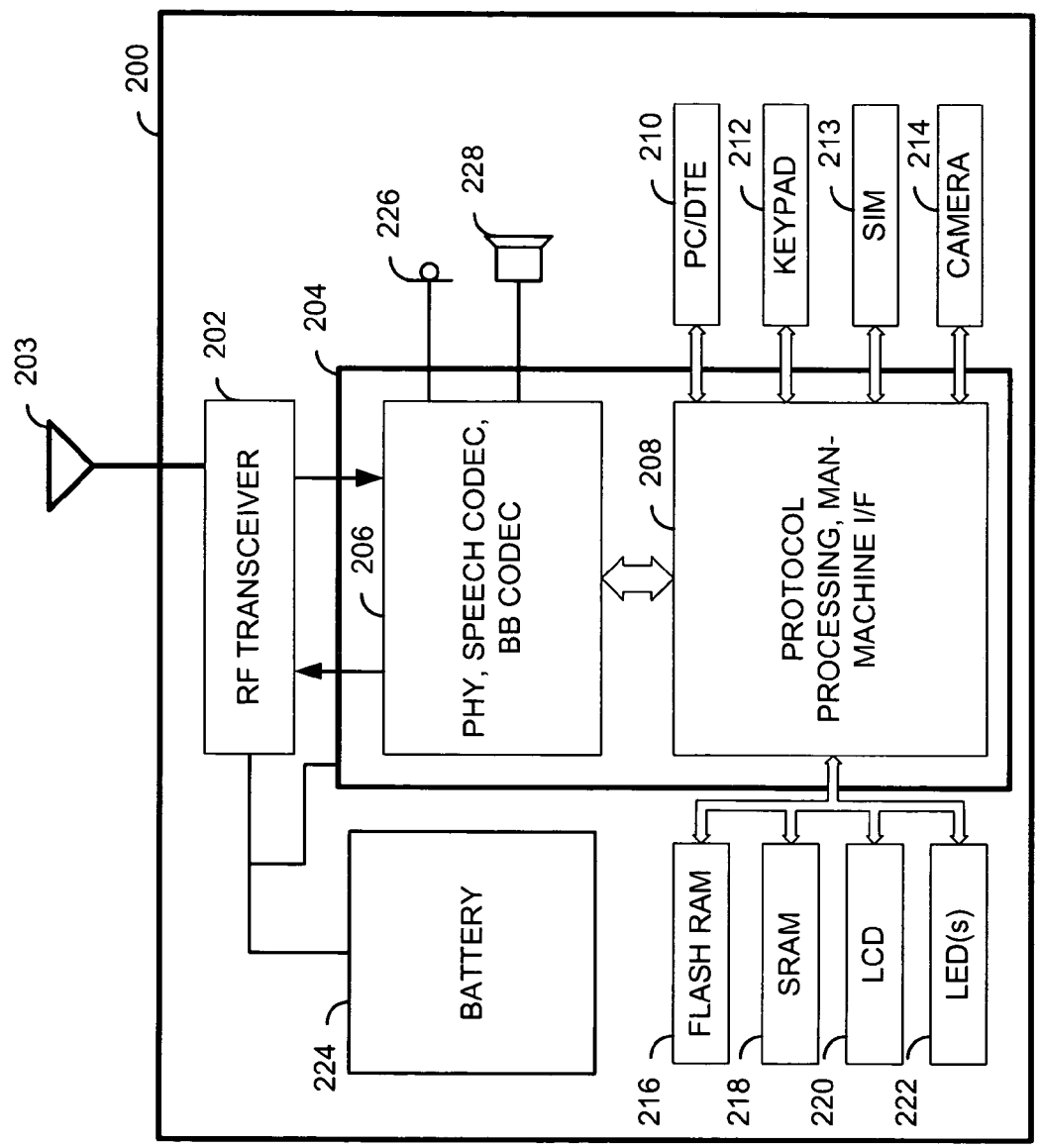
FIG. 2 is a block diagram functionally illustrating a wireless terminal constructed according to the present invention.

FIG. 2 is a block diagram functionally illustrating a wireless terminal 200 constructed according to the present invention. The wireless terminal 200 of FIG. 2 includes an RF transceiver 202, digital processing components 204, and various other components contained within a case. The digital processing components 204 includes two main functional components, a physical layer processing, speech COder/DECoder (CODEC), and baseband CODEC functional block 206 and a protocol processing, man-machine interface functional block 208. A Digital Signal Processor (DSP) is the major component of the physical layer processing, speech COder/DECoder (CODEC), and baseband CODEC functional block 206 while a microprocessor, e.g., Reduced Instruction Set Computing (RISC) processor, is the major component of the protocol processing, man-machine interface functional block 208. The DSP may also be referred to as a Radio Interface Processor (RIP) while the RISC processor may be referred to as a system processor. However, these naming conventions are not to be taken as limiting the functions of these components.

The RF transceiver 202 couples to an antenna 203, to the digital processing components 204, and also to a battery 224 that powers all components of the wireless terminal 200. The physical layer processing, speech COder/DECoder (CODEC), and baseband CODEC functional block 206 couples to the protocol processing, man-machine interface functional block 208 and to a coupled microphone 226 and speaker 228. The protocol processing, man-machine interface functional block 208 couples to a Personal Computing/Data Terminal Equipment interface 210, a keypad 212, a Subscriber Identification Module (SIM) port 213, a camera 214, a flash RAM 216, an SRAM 218, a LCD 220, and LED(s) 222. The camera 214 and LCD 220 may support either/both still pictures and moving pictures. Thus, the wireless terminal 200 of FIG. 2 supports video services as well as audio services via the cellular network.

Figure 3:
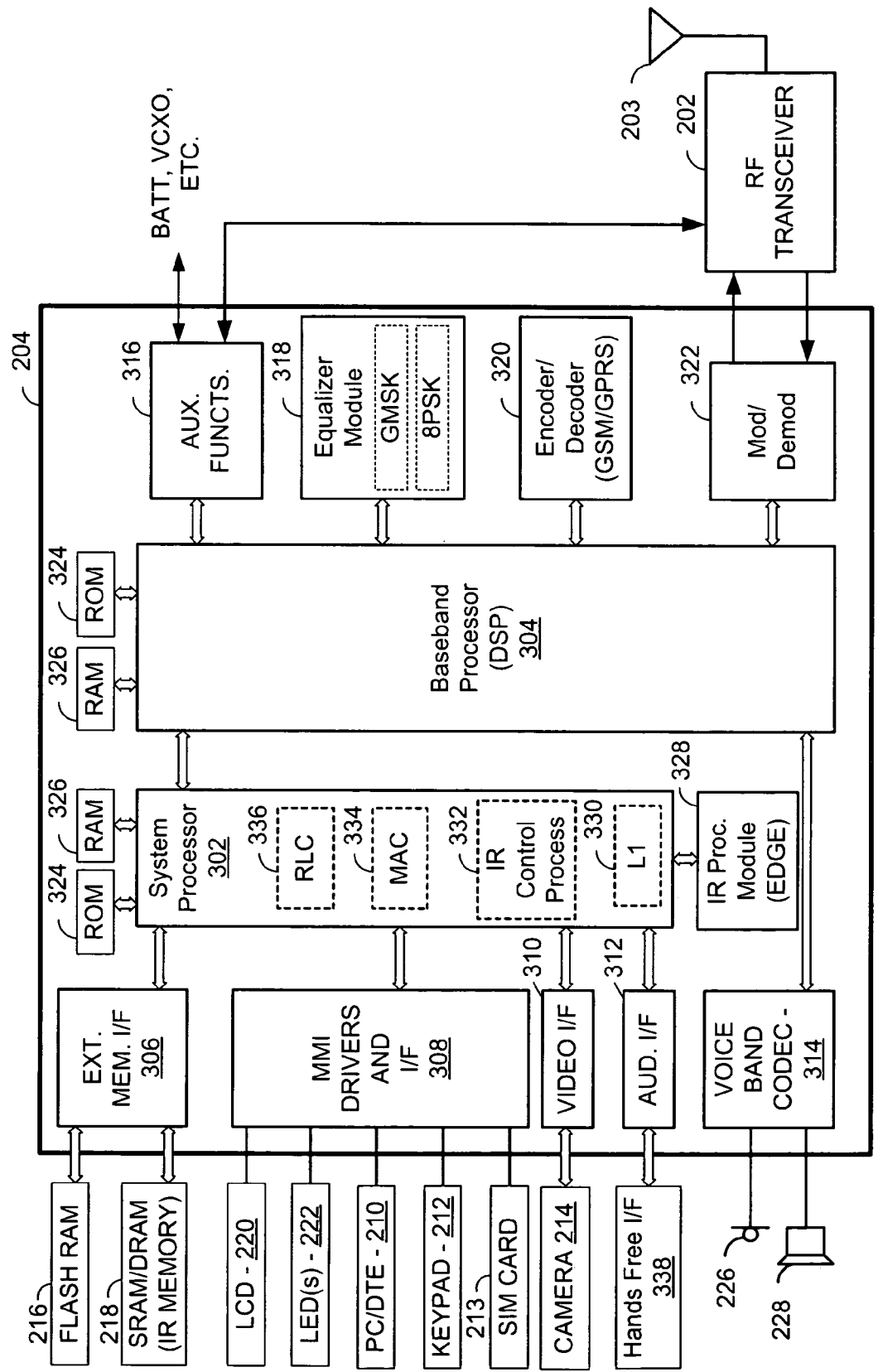
FIG. 3 is a block diagram illustrating in more detail the wireless terminal of FIG. 2, with particular emphasis on the digital processing components of the wireless terminal.

FIG. 3 is a block diagram illustrating in more detail the wireless terminal of FIG. 2, with particular emphasis on the digital processing components of the wireless terminal. The digital processing components 204 include a system processor 302, a baseband processor 304, and a plurality of supporting components. The supporting components include an external memory interface 306, MMI drivers and I/F 308, a video I/F 310, an audio I/F 312, a voice band CODEC 314, auxiliary functions 316, a modulator/demodulator 322, ROM 324, RAM 326 and a plurality of processing modules. In some embodiments, the modulator/demodulator 322 is not a separate structural component with these functions being performed internal to the baseband processor 304.

The processing modules are also referred to herein as accelerators, co-processors, processing modules, or otherwise, and include auxiliary functions 316, an equalizer module 318, an enCOder/DECoder (CODEC) processing module 320, and an Incremental Redundancy (IR) processing module 328. The interconnections of FIG. 3 are one example of a manner in which these components may be interconnected. Other embodiments support additional/alternate couplings. Such coupling may be direct, indirect, and/or may be via one or more intermediary components.

RAM and ROM service both the system processor 302 and the baseband processor 304. Both the system processor 302 and the baseband processor 304 may couple to shared RAM 326 and ROM 324, couple to separate RAM, coupled to separate ROM, couple to multiple RAM blocks, some shared, some not shared, or may be served in a differing manner by the memory. In one particular embodiment, the system processor 302 and the baseband processor 304 coupled to respective separate RAMs and ROMs and also couple to a shared RAM that services control and data transfers between the devices. The processing modules 316, 318, 320, 322, and 328 may coupled as illustrated in FIG. 3 but may also coupled in other manners in differing embodiments.

The system processor 302 services at least a portion of a serviced protocol stack, e.g., GSM/GPRS/EDGE protocol stack. In particular the system processor 302 services Layer 1 (L1) operations 330, a portion of Incremental Redundancy (IR) GSM protocol stack operations 332 (referred to as "IR control process"), Medium Access Control (MAC) operations 334, and Radio Link Control (RLC) operations 336. The baseband processor 304 in combination with the modulator/demodulator 322, RF transceiver, equalizer module 318, and/or encoder/decoder module 320 service the Physical Layer (PHY) operations performed by the digital processing components 204. The baseband processor 304 may also services a portion of the GSM/GPRS/EDGE protocol stack.

Still referring to FIG. 3, the baseband processor 304 controls the interaction of the baseband processor 304 and equalizer module 318. As will be described further, the baseband processor 304 is responsible for causing the equalizer module 318 and the CODEC processing module 320 to process received RF bursts that reside within slots of a GSM frame. In the particular embodiment of FIGS. 2 and 3, with single RF front end 202, wireless terminal 200 may receive and process RF bursts in up to four slots of each GSM frame, i.e., be assigned four slots for forward link transmissions in any particular GSM frame. In another embodiment in which the wireless terminal 200 includes more than one RF front end, the wireless terminal 200 may be assigned more than four slots in each sub-frame of the GSM frame. In this case, required transmit operations would be performed using a second RF front end while a first RF front end would perform the receive operations. When the forward link transmissions and the reverse link transmissions occupy different channels with sufficient frequency separation, and the wireless terminal otherwise supports full duplex operations, the wireless terminal could receive and transmit at the same time.

The combination of the RF front end 202, and base band processor 204, which may include an optional CODEC processing module, receive RF communications from the servicing base station. In one embodiment the RF front end 202 and base band processor 204 receive and process RF bursts from servicing base stations. The combination of RF front end 202 and base band processor 204 are operable to receive RF bursts transmitted according to a transmission scheme wherein the transmission scheme includes both a modulation format and a coding format. Base band processor 204 to produce a data block decodes sequences of soft decisions, extracted from the RF bursts. The sequence of soft decisions may decode successfully into the data block as indicated by error correction coding results. These soft decisions may be protected by cyclical redundant coding (CRC) and convolutional coding. These soft decisions may be protected by cyclical redundant coding (CRC) such as fire coding and convolutional coding. The combination determines whether the decoding of the data block was successful and uses this information to help determined the reported BEP for the data block. When the decoding is unsuccessful the reported BEP is set to the measured quality report or BEP plus an increment step size or should the decoding be successful, the reported BEP is set to the measured quality report or BEP minus a decrement step size. The reported BEP may be set to a quality threshold or BEP threshold when the decoding is unsuccessful and threshold exceeds the measured BEP.

Re-encoding of properly decoded data blocks produces a sequence of re-encoded decisions which when compared to the sequence of soft decisions produces a Re-encoded Bit Error (RBER). The BEP reported to the servicing base station is based upon the estimated BEP derived from the SNR and the RBER. When the decoding is unsuccessful, the BEP may be based upon more heavily or solely the estimated BEP provided by the SNR. Similarly, when the decoding is successful, the BEP may be based upon more heavily or solely the RBER or BLER. The BLER is often considered as giving a more objective quality measurement than the BEP or RBER. This allows the BEP to more accurately reflect actual channel conditions. The measured BEP may rely on both the current data block and previous data blocks. Some embodiments use only the estimated BEP to calculate the measured BEP when decoding was unsuccessful. Other embodiments rely only on the RBER. However, both the estimated BEP and RBER may be used to determine the measured BEP whether or not the data block decoded successfully. Thus, LA decisions can more effectively select an appropriate MCS based upon existing channel conditions.

Figure 4:
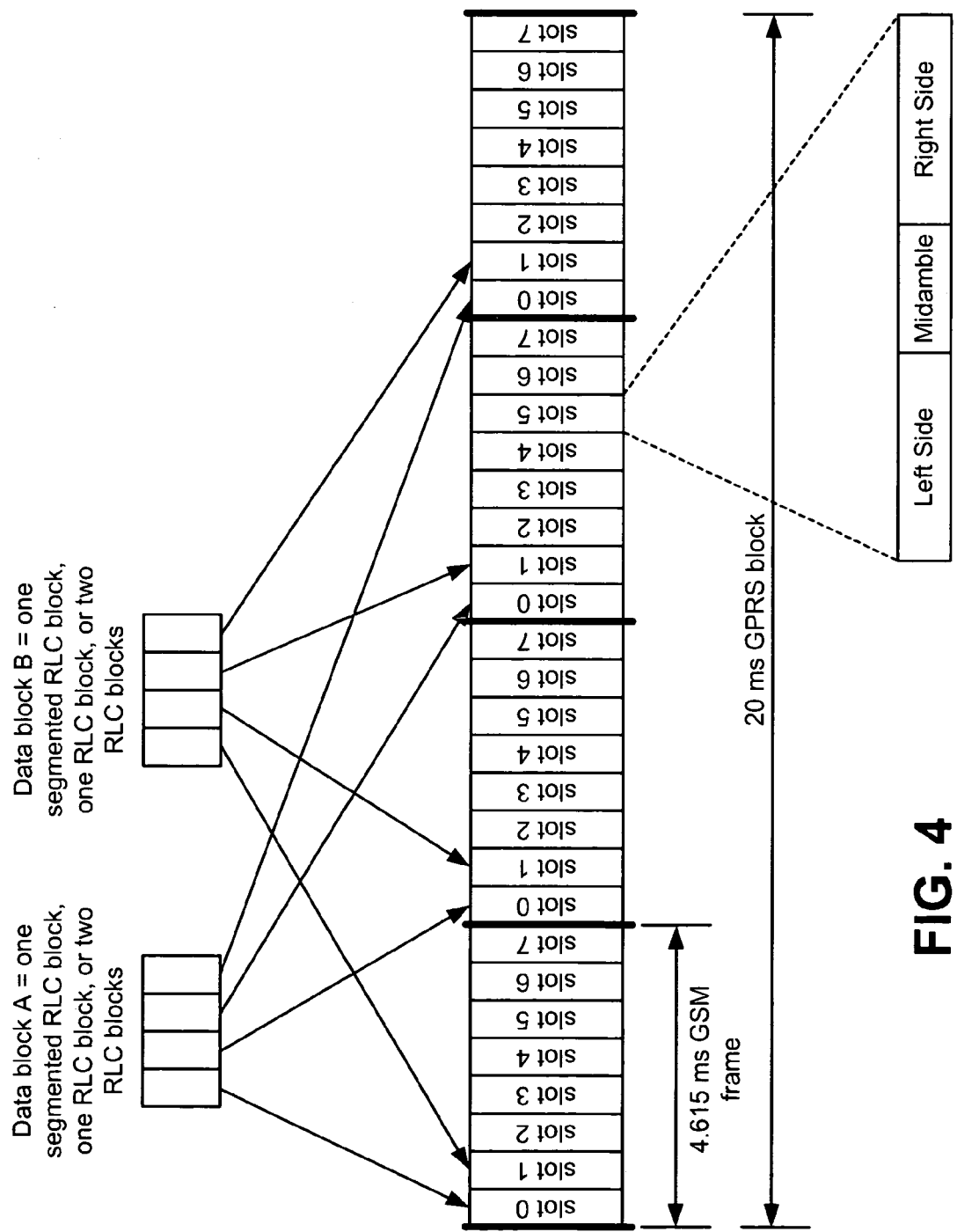
FIG. 4 is a block diagram illustrating the general structure of a GSM frame and the manner in which data blocks are carried by the GSM frame.

FIG. 4 is a block diagram illustrating the general structure of a GSM frame and the manner in which data blocks are carried by the GSM frame. The GSM frame is 4.615 ms in duration, including guard periods, and each of which includes eight slots, slots 0 through 7. Each slot is approximately 577 μs in duration, includes a left side, a midamble, and a right side. The left side and right side of a normal RF burst of the time slot carry data while the midamble is a training sequence.

The RF bursts of four time slots of the GPRS block carry a segmented RLC block, a complete RLC block, or two RLC blocks, depending upon a supported Modulation and Coding Scheme (MCS) mode. For example, data block A is carried in slot 0 of sub-frame 1, slot 0 of sub-frame 2, slot 0 of sub-frame 3, and slot 0 of sub-frame 3. Data block A may carry a segmented RLC block, an RLC block, or two RLC blocks. Likewise, data block B is carried in slot 1 of sub-frame 1, slot 1 of sub-frame 2, slot 1 of sub-frame 3, and slot 1 of sub-frame 3. The MCS mode of each set of slots, i.e., slot n of each sub-frame, for the GSM frame is consistent for the GSM frame. Further, the MCS mode of differing sets of slots of the GSM frame, e.g., slot 0 of each sub-frame vs. any of slots 1–7 of each sub-frame, may differ. This ability allows LA to be implemented. As will be described further with reference to FIG. 5, the wireless terminal 200 may be assigned multiple slots for forward link transmissions that must be received and processed by the wireless terminal 200.

Figure 5:
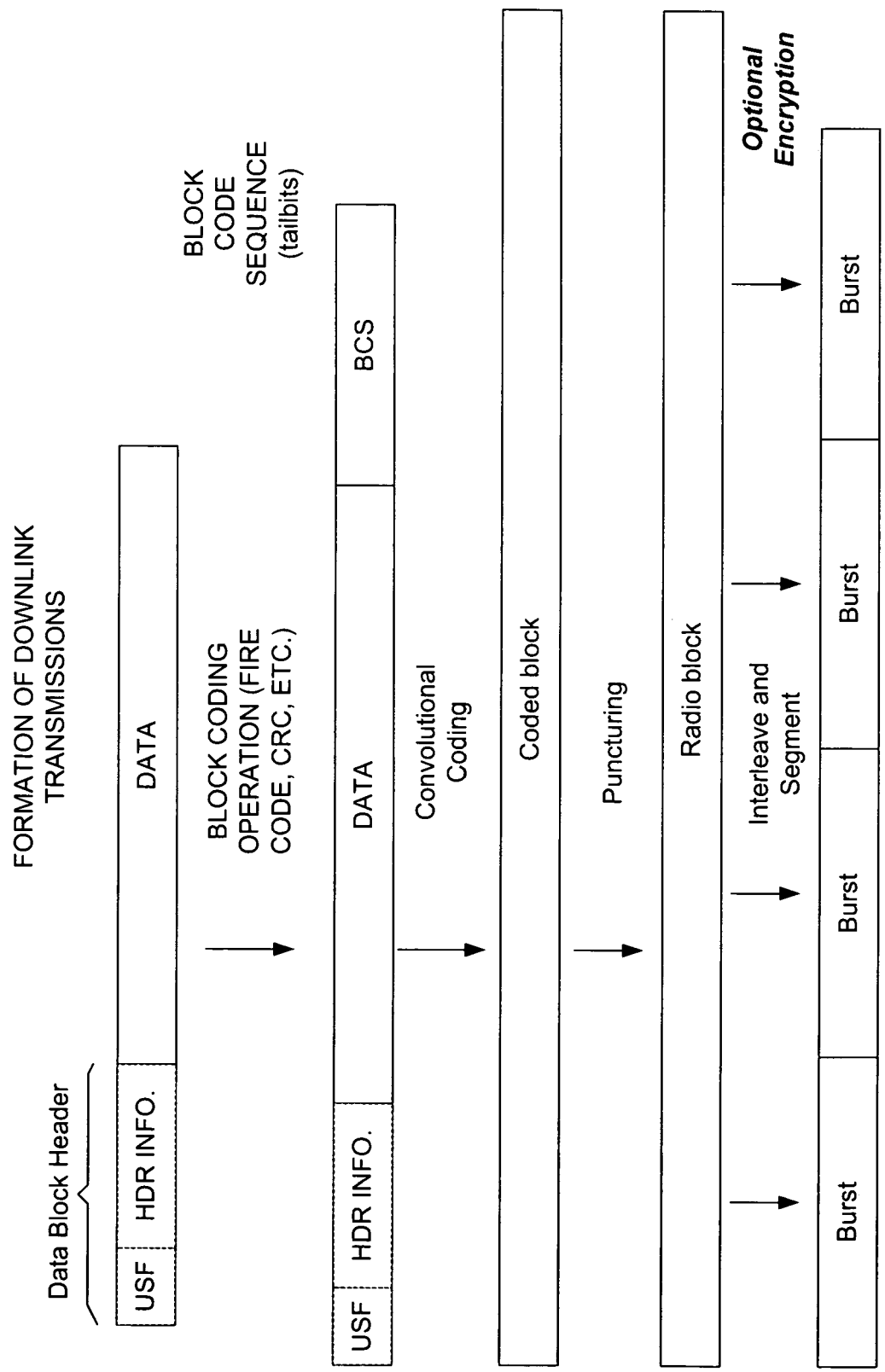
FIG. 5 is a block diagram illustrating the formation of down link transmissions.

FIG. 5 depicts the various stages associated with mapping data into RF bursts. A Data Block Header and Data are initially unencoded. The block coding operations perform the outer coding for the data block and support error detection/correction for data block. The outer coding operations typically employ a cyclic redundancy check (CRC) or a Fire Code. The outer coding operations are illustrated to add tail bits and/or a Block Code Sequence (BCS), which is/are appended to the Data. After block coding has supplemented the Data with redundancy bits for error detection, calculation of additional redundancy for error correction to correct the transmissions caused by the radio channels. The internal error correction or coding scheme of GSM is based on convolutional codes.

Some coded bits generated by the convolutional encoder are punctured prior to transmission. Puncturing increases the rate of the convolutional code and reduces the redundancy per data block transmitted. Puncturing additionally lowers the bandwidth requirements such that the convolutional encoded signal fits into the available channel bit stream. The convolutional encoded punctured bits are passed to an interleaver, which shuffles various bit streams and segments the interleaved bit streams into the 4 bursts shown.

Each RF burst has a left side, a midamble, and a right side. The left side and right side contain data. The midamble consists of predefined, known bit patterns, the training sequences, which are used for channel estimation to optimize reception with an equalizer and for synchronization. With the help of these training sequences, the equalizer eliminates or reduces the intersymbol interferences, which can be caused by propagation time differences of multipath propagation. A number of training sequences are defined for normal RF bursts in the GSM standard. However, the exact configuration of the training sequences may depend on the modulation format used. Each set of four bursts typically utilizes the same modulation format. By analyzing the training sequence one can determine the modulation format.

Figure 6:
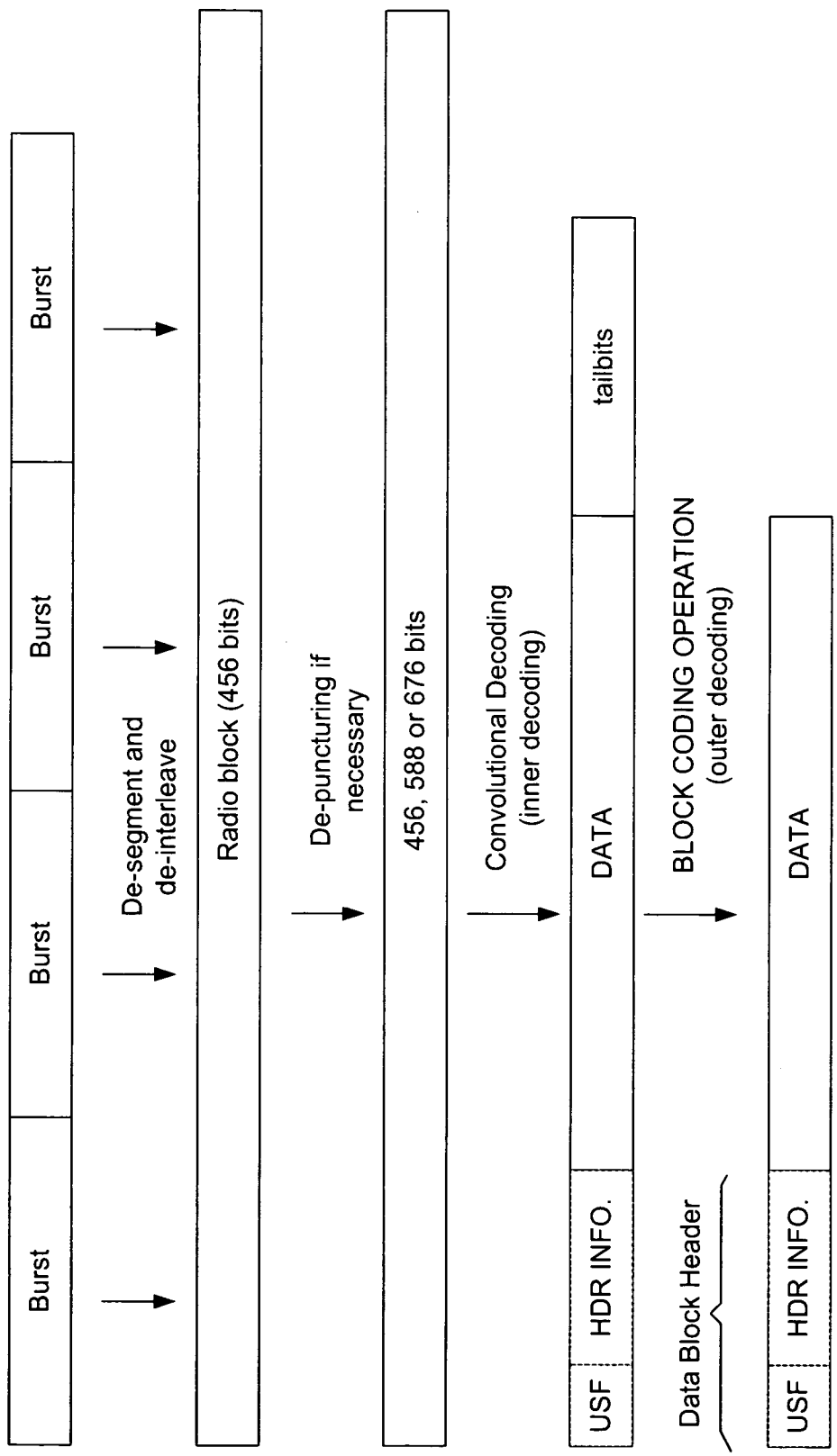
FIG. 6 is a block diagram illustrating the recovery of a data block from a down link transmissions.

FIG. 6 is a block diagram depicting the various stages associated with recovering a data block from RF bursts. Four RF bursts making up a data block are received and processed. Once all four RF bursts have been received, the RF bursts are combined to form an encoded data block. The encoded data block is then depunctured (if required), decoded according to an inner decoding scheme, and then decoded according to an outer decoding scheme. For MCS 1–4, the decoded data block includes the data block header and the data, for MCS5–9, data block and header block are coded separately. Successful decoding may be signaled by appropriate tailbits appended to the data following convolutional decoding (error correction coding).

Figure 7:
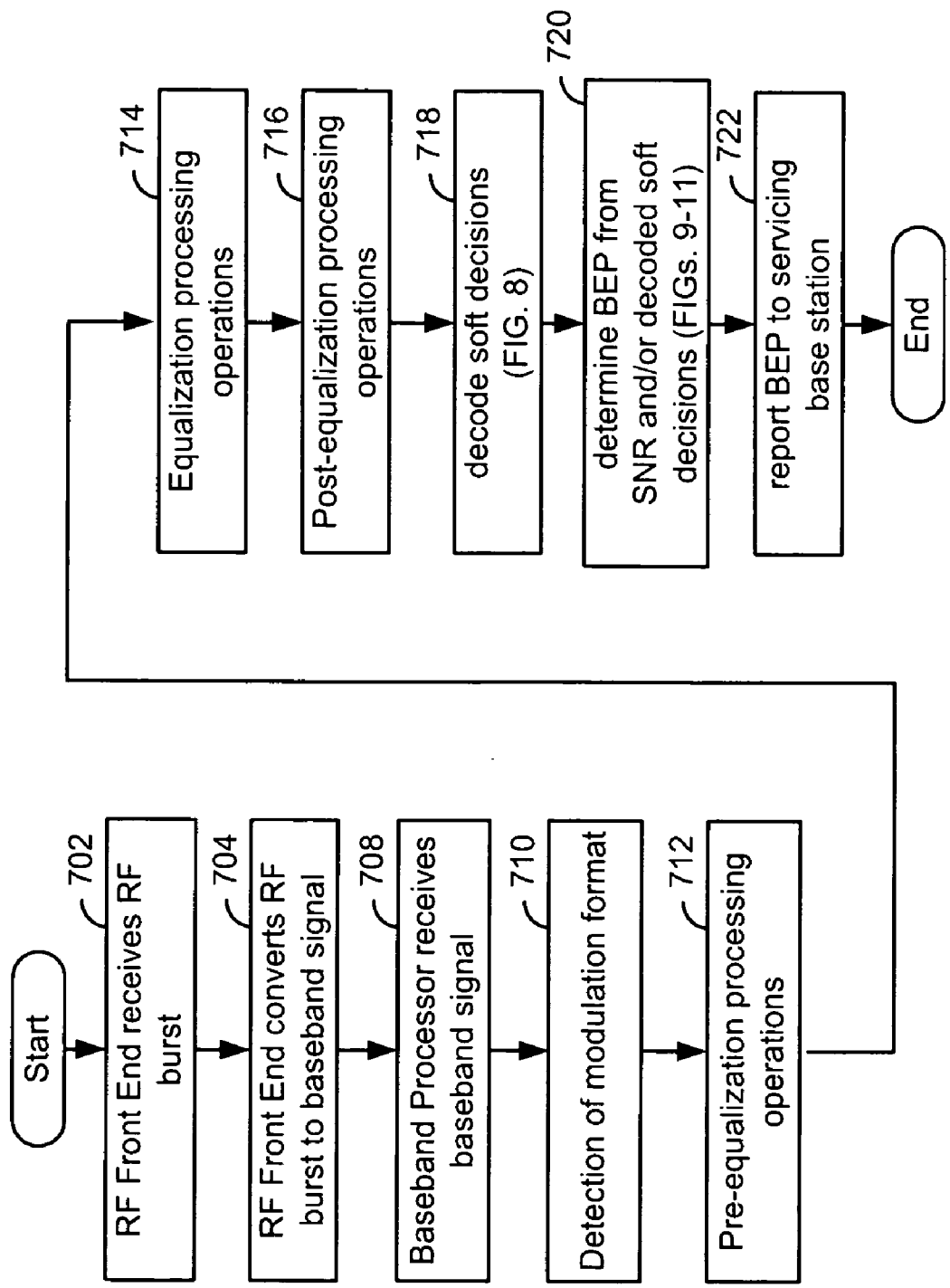
FIG. 7 is a flow chart illustrating operation of a wireless terminal in receiving and processing a RF burst.

FIG. 7 is a flow charts illustrating operation of a wireless terminal 200 in receiving and processing RF bursts. The operations illustrated correspond to a single RF burst in a corresponding slot of GSM frame. The RF front end 202, the baseband processor 304, and the equalizer module 318 illustrated in FIG. 3 perform these operations. These operations are generally called out as being performed by one of these components. However, the split of processing duties among these various components may differ without departing from the scope of the present invention.

A single processing device or a plurality of processing devices operably coupled to memory performs the processing duties. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory may be a single memory device or a plurality of memory devices. Such a memory device may be a read-only memory, random access memory, volatile memory, non-volatile memory, static memory, dynamic memory, flash memory, cache memory, and/or any device that stores digital information. Note that when the processing duties are implemented via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. The processing duties include the execution of operational instructions corresponding to at least some of the steps and/or functions illustrated in FIGS. 6–10.

Referring particularly to FIG. 7, operation commences with the RF front end 202 receiving an RF burst in a corresponding slot of a GSM frame (step 702). The RF front end 202 then converts the RF burst to a baseband signal (step 704). Upon completion of the conversion, the RF front end 202 stores the converted baseband signal. When needed the baseband processor samples the converted baseband signal from the RF front end. Thus, as referred to in FIG. 7, the RF front end 202 performs steps 702–704.

Operation continues with the baseband processor 304 receiving the baseband signal (step 708). In a typical operation, the RF front end 202, the baseband processor 304, or modulator/demodulator 322 samples the analog baseband signal to digitize the baseband signal. After receipt of the baseband signal (in a digitized format), the baseband processor 304 performs detection of a modulation format of the baseband signal (step 710). This detection of the modulation format determines the modulation format of the corresponding baseband signal. Proper determination of the modulation format is necessary in order to properly estimate the channel quality from the SNR of the channel. In one particular embodiment according to the GSM standard, the modulation format will be either Gaussian Minimum Shift Keying (GMSK) modulation or Eight Phase Shift Keying (8PSK) modulation. The baseband processor 304 makes the determination (step 712) and appropriately processes the RF bursts based upon the detected modulation format.

The baseband processor performs pre-equalization processing of the RF burst in step 712. For GMSK modulation, this processing involves de-rotation and frequency correction; burst power estimation; timing, channel, noise, and signal-to-noise ratio (SNR) estimation; automatic gain control (AGC) loop calculations; soft decision scaling factor determination; and matched filtering operations on the baseband signal. For 8PSK modulation, pre-equalization processing of the RF bursts involves de-rotation and frequency correction; burst power estimation; timing, channel, noise, and SNR estimations; AGC loop calculations; Decision Feedback Equalizer (DFE) coefficients calculations; and soft decision scaling factors for the baseband signal. The SNR estimation from the pre-equalization processing operations may be used later to determine the estimated BEP. Possible methods for determination of the estimated BEP are detailed in FIGS. 9–11. These pre-equalization processing operations produce a processed baseband signal. Upon completion of these pre-equalization processing operations, the baseband processor 304 issues a command to the equalizer module 318.

The equalizer module 318, upon receiving the command, prepares to equalize the processed baseband signal based upon the modulation format, e.g., GMSK modulation or 8PSK modulation in step 714. The equalizer module 318 receives the processed baseband signal, settings, and/or parameters from the baseband processor 304 and equalizes the processed baseband signal.

After equalization, the equalizer module 318 then issues an interrupt to the baseband processor 304 indicating that the equalizer operations are complete for the RF bursts. The baseband processor 304 then receives the soft decisions from the equalizer module 318. Next, the baseband processor 304 performs "post-equalization processing" as shown in step 716. This may involve determining an average phase of the left and right sides based upon the soft decisions received from the equalizer module 318 and frequency estimation and tracking based upon the soft decisions received from the equalizer module 318.

The sequences of soft decisions are decoded in step 718. One particular method of decoding the soft decisions is further detailed in FIG. 8. The decoded soft decisions may be used to produce a RBER. Failure to properly decode the soft decisions may be assigned a RBER threshold based on the modulation format and coding scheme. This process of producing an RBER will be described in further detail in association with the description of FIGS. 9–11 and following. With the estimated BEP and/or RBER, baseband processor 304 or system processor 302 produce a BEP in step 720, this in turn is reported to the servicing base station in step 722. While the operations of FIG. 7 are indicated to be performed by particular components of the wireless terminal, such segmentation of operations could be performed by differing components. For example, the baseband processor 304 or system processor 302 in other embodiments could perform the equalization operations. Further, the baseband processor 304 or the system processor 302 in other embodiments could also perform decoding operations.

Figure 8:
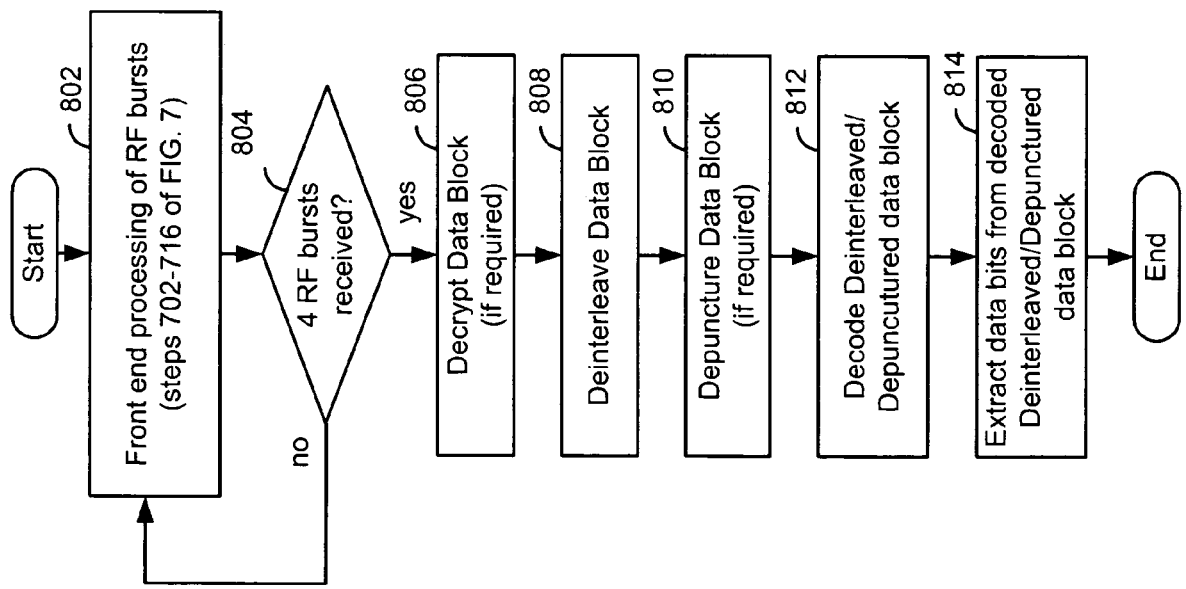
FIG. 8 is a flow chart illustrating operations to recover a data block.

FIG. 8 is a flow chart illustrating operations to decode a data block according to an embodiment of the present invention. Operations commence with receiving and processing RF bursts (front-end processing of RF bursts) in step 802 and as described with reference to steps 702–716 of FIG. 7. After receiving the four RF bursts that complete an EDGE or GPRS data block, as determined at step 804, operation proceeds to step 806.

A header of the data block identifies the coding scheme and puncturing pattern of the data block. For example, the coding scheme may be any one of the MCS-1 through MCS-9 coding schemes, each of which may include multiple puncturing patterns. Operation uses the training sequence of each RF burst, located within the midamble of the RF burst, to identify the modulation format of the RF bursts.

Data recovery begins in step 806 where, if necessary, the data block is decrypted. The data block is then de-interleaved (step 808) according to a particular format of the data block, e.g. MCS-1 through MCS-9. The data block is then de-punctured (step 810). At step 812, the de-interleaved and de-punctured data block is decoded. Decoding operations may include combining previously received copies of the data block with the current copy of the data block. Data bits of the decoded data block are then processed further (step 814). Properly decoded data blocks can be re-encoded to produce a sequence of re-encoded decisions that when compared to the sequence of soft decisions result in the RBER. The RBER may provide a more accurate indication of the performance of the selected MCS than that provided by the estimated BEP, which is based on the SNR.

Figure 9:
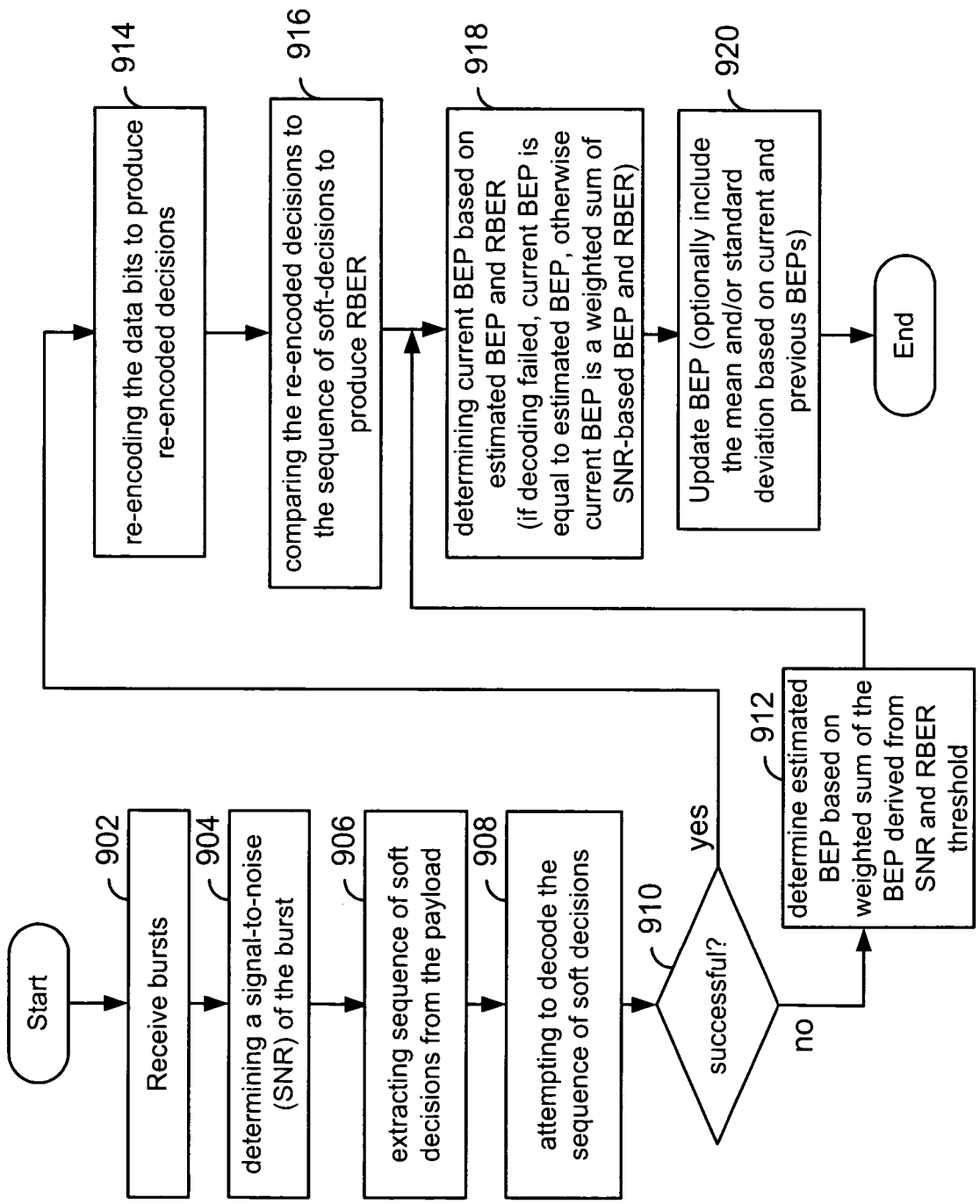
FIG. 9 is a logic diagram illustrating methods for operating a wireless terminal to determine a channel quality of received bursts.

FIG. 9 is a logic diagram illustrating a method for operating a wireless terminal to determine a BEP of received bursts. The method commences with receiving the RF bursts in step 902. Next, the signal-to-noise (SNR) of the RF bursts is determined in step 904. The determination of the SNR in step 904 is typically completed as part of the pre-equalization processing of step 712. The extracted training sequence of a RF burst may be used to produce a burst SNR. The block SNR, averaging over 4 burst SNRs, maps to an estimated BEP based on the modulation format. Continuing with step 906, a sequence of soft decisions is extracted from the payload of each RF burst. An attempt to decode the sequence of soft decisions extracted from data bits of the 4 RF bursts is made in step 908. When the attempt to decode the plurality of soft decisions is unsuccessful (as determined at decision point 910), the BEP of the RF burst is determined based upon the SNR (estimated BEP) and the RBER threshold associated with the current MCS mode in step 912 of FIG. 9. When the sequence of soft decisions decodes successful at decision point 910, the data bits are re-encoded to produce a sequence of re-encoded decisions at step 914. Then, the sequence of re-encoded decisions is compared to the sequence of soft-decisions in step 916. This comparison results in a RBER upon which the current BEP may be based (step 918). The BEP is updated by the terminal in step 920. This update may also include the historical performance of the current BEP in determining the BEP update to the servicing base station by including the mean and/or standard deviation of the historical or previous BEPs.

Figure 10:
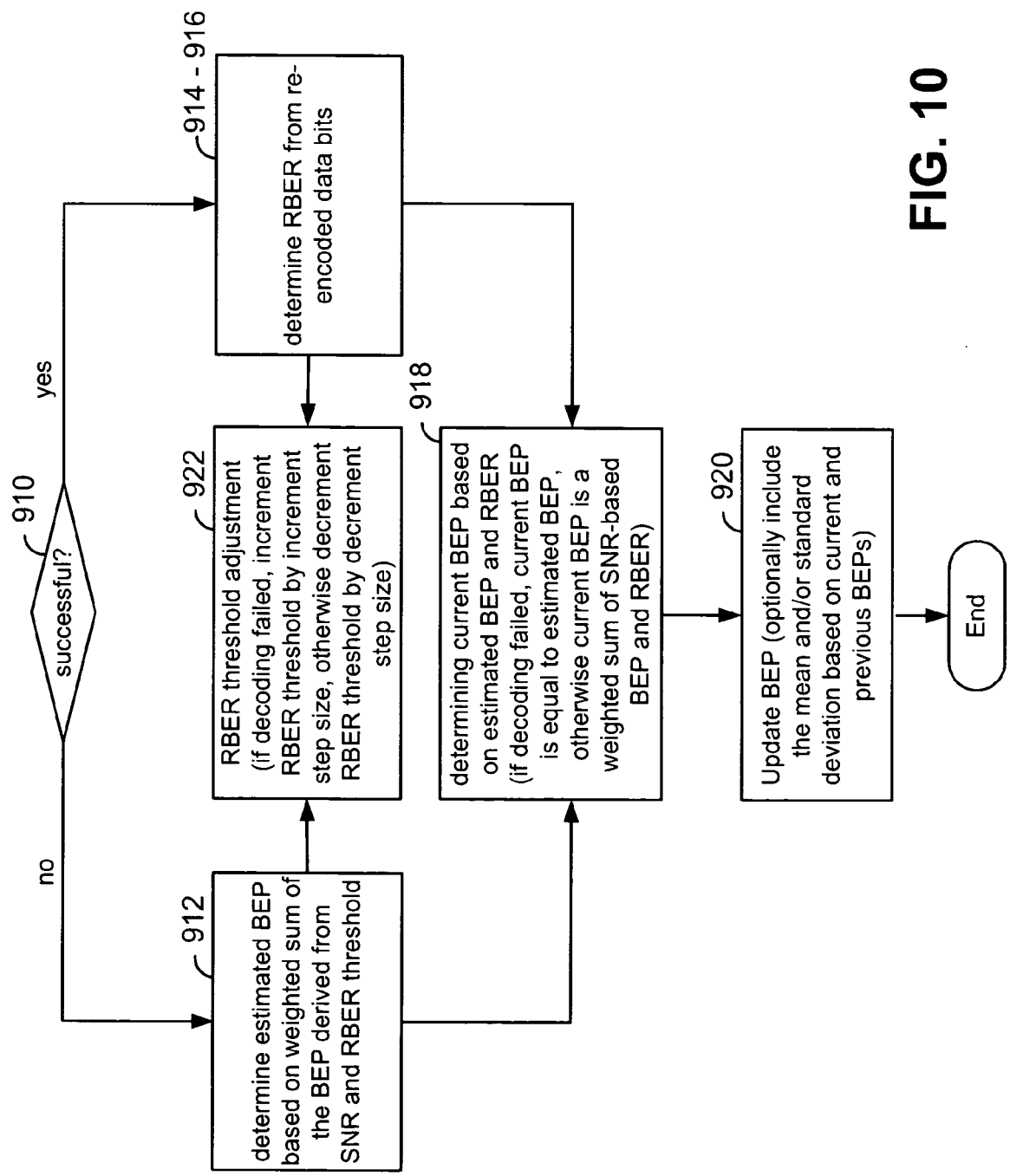
FIG. 10 is a logic diagram illustrating an embodiment of using link threshold adaptation in determining reported channel quality based upon decoding results.

In FIG. 10, the RBER threshold value based on the modulation format and coding scheme may be incremented or decremented depending on the results of the attempt to decode the plurality of soft decisions as determined at decision point 910 and the channel quality. The current BEP of the RF bursts may be determined based upon a weighted sum of the SNR-based BEP and RBER threshold when unsuccessful decoding occurs. Similarly, when the sequence of soft decisions decodes successfully, the current BEP of the RF bursts may be determined based upon a weighted sum of the SNR-based BEP and RBER of the data bits, wherein different weighting values or coefficients are assigned to the SNR and RBER depending on the channel quality as measured by the BLER (Block Error Rate). Additionally, this embodiment adaptively adjusts the RBER threshold depending on the actual performance of the decoding process. When the attempt to decode the plurality of soft decisions is unsuccessful at decision point 910, the RBER threshold may be adjusted in step 922. In Step 922, which follows step 912 when the decoding fails, the RBER threshold may be incremented until it reaches an upper bound for the RBER threshold. The size of this increment may be determined by the channel quality as measured by the BLER or other like measure known to those skilled in the art. If no information is present on the channel quality, a minimum or default value for the increment step size may be chosen.

When the attempt to decode the plurality of soft decisions is successful at decision point 910, the RBER threshold may be adjusted in step. In Step 922, which follows step 914 and 916 when the decoding succeeds, the RBER threshold may be decremented until it reaches a lower bound for the RBER threshold. As with the increment step size, the decrement step size may be determined by channel quality as measured by the BLER or other like measure of channel quality. When no current information exists on channel quality, a minimum or default value for the decrement step size may be chosen.

Figure 11:
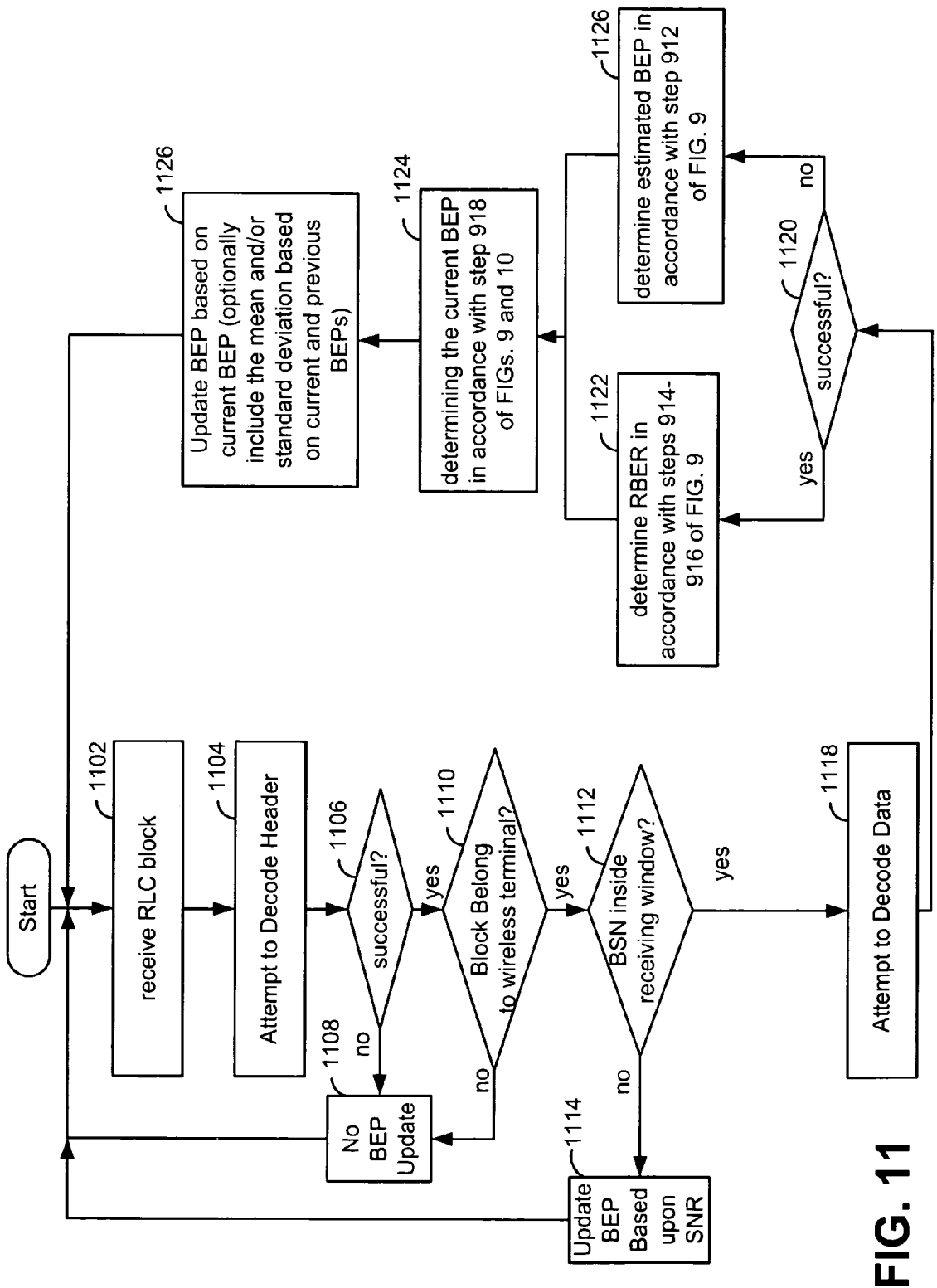
FIG. 11 is a logic diagram illustrating an overall control flow in updating the quality measure BEP.

FIG. 11 is a logic diagram illustrating overall control flow for operating a wireless terminal to determine a BEP of received data block. A sequence of soft information of a RLC block extracted from payload of 4 RF bursts is received (step 1002). The burst will typically be one of four portions of an RLC block and typically carries a training sequence (mid amble), a header, a data block, and a tail/trailer. The sequence carries data and header. Upon receipt of the sequence, an attempt is made to decode the header (step 1104). Decoding the header allows the coding scheme to be readily identified. This information is coupled with knowledge to the modulation format to determine the MCS of the received sequence. If the decode is not successful (as determined at step 1106), no BEP update is performed (step 1108) and operation returns to step 1102 wherein another sequence is awaited. If the header decode is successful (as determined at step 1106), operation proceeds to step 1110 where the wireless terminal determines whether the data block carried in the bursts is intended for the wireless terminal. If the data block is not intended for the wireless terminal, the operation proceeds to step 1108 and no BEP update/calculation occurs. This prevents unnecessary BEP calculations and potential LA decisions being based on communications not intended for the wireless terminal.

If the data block carried in the bursts does belong to the wireless terminal (as determined at step 1110), the wireless terminal next determines whether the Block Sequence Number (BSN) of the data block is within a receiving window under consideration (step 1112). If not, the BEP is updated based upon the SNR of the block (at step 1114) and operation proceeds from step 1114 to step 1102 where another sequence is awaited. If the BSN is inside the receiving window (as determined at step 1112), the wireless terminal then attempts to decode the received data block (step 1118).

If the decode attempt is successful, as determined at decision point 1120, the decoded data is re-encoded in step 1122 to produce a RBER based upon the re-encoded data as was previously described in reference to steps 914 and 916 of FIGS. 9 and 10, and the current BEP is updated based upon the RBER count in step 1124. If the decoding attempt is not successful (as determined at decision point 1120), operation proceeds to step 1126 where the current BEP is updated based upon the estimated BEP based on SNR, or RBER threshold based on the modulation format as was previously described in reference to step 912 of FIG. 9. In this instance the RBER threshold is not a predefined value but rather a value that changes depending on the historical results of the attempt to decode in step 1118. The RBER threshold will be decremented or incremented (step 922, FIG. 10) depending on the success or failure of the attempt to decode in step 1118. From both steps 1122 and 1126 operation returns to step 1124 where the current BEP is determined. The BEP update may further include the historical performance of the BEP by including the long-term mean and/or standard deviation of the BEP.

Whether the LA can be effective highly depends on the accuracy of the channel downlink quality reports from the wireless terminal. However, measurement errors are unavoidable from wireless terminals that experience changing channel conditions. Moreover, the LA decisions made on existing networks are usually based upon one (or a very few) available test wireless terminals. As a result, these LA decisions may not be appropriate for other wireless terminals, leading to unsuitable modulation formats and coding schemes being used for the wireless terminal and thus lower the data throughput. In the worst case, this will lead to data transfer stall, which is more prominent in low receive signal strength conditions (RSSI). Adaptively adjusting the RBER threshold allows the system to consider the historical performance of the RF communications between the wireless terminal and servicing base station. By considering historical performance when making LA decisions, spurious and unnecessary LA decisions based on a single data point can be avoided. This process helps to eliminate unnecessary LA decisions while reporting more representative channel quality conditions.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A method to determine a channel quality, as represented by a current bit error probability (BEP) for radio frequency (RF) bursts transmitted from a servicing base station to a wireless terminal in a cellular wireless communication system, the method comprising:
   receiving the RF bursts by the wireless terminal wherein the RF bursts are transmitted according to a transmission scheme;
   forming a data block from the RF bursts;
   decoding the data block;
   determining whether decoding of the data block was successful;
   determining a measured quality report for the data block;
   when decoding is unsuccessful:
      setting the current BEP to a weighted sum of the estimated quality report and a quality report threshold; and
      incrementing the quality report threshold by an increment step size until an upper quality report threshold limit is reached;
   when decoding is successful:
      setting the current BEP to the measured quality report; and
      decrementing the quality report threshold by a decrement step size until a lower quality report threshold limit is reached.

2. The method of claim 1, wherein the current quality report comprises a current BEP report; the estimated quality report comprises an estimated BEP derived from SNR; the quality report threshold comprises a Re-encoded Bit Error Rate (RBER) threshold; and the measured quality report comprises a RBER based on re-encoding the data block.

3. The method of claim 2, wherein an updated quality report to be sent to the network is determined based upon both the current quality report and at least one prior quality report.

4. The method of claim 3, wherein the weighted sum of the estimated quality report and quality report threshold is based on a channel quality measure.

5. The method of claim 4, wherein the increment step size and decrement step size are based on a channel quality measure.

6. The method of claim 4, wherein the channel quality measure comprises a block error report (BLER).

7. The method of claim 4, wherein the transmission scheme comprises:
   a coding scheme; and
   a modulation format.

8. The method of claim 7, wherein the SNR maps to the estimated BEP based upon the modulation scheme of the RF burst.

9. The method of claim 7, wherein the modulation format of the RF burst is GMSK or 8PSK.

10. The method of claim 7, wherein the RBER threshold is based on a modulation and coding Scheme of the RF bursts.

11. The method of claim 1, wherein the wireless terminal operates according to the GSM standard.

12. The method of claim 1, further comprising the servicing base station selecting a transmission scheme for the wireless terminal using the updated BEP.

13. A wireless terminal that comprises:
   a Radio Frequency (RF) front end;
   a baseband processor communicatively coupled to the RF front end;
   an enCOder/DECoder (CODEC) processing module communicatively coupled to the baseband processor;
   wherein, the RF front end, the baseband processor, and the CODEC processing module are operable to:
      receive RF bursts transmitted according to a transmission scheme;
      form a data block from the RF bursts;
      decode the data block;
      determine whether decoding of the data block was successful;
      determine a current quality report for the data block;
      when decoding is unsuccessful:
         set the current quality report to a weighted sum of the estimated quality report and a quality report threshold; and
         increment the quality report threshold by an increment step size until an upper quality report threshold limit is reached;
      when decoding is successful:
         set the current quality report to the measured quality report; and
         decrement the quality report threshold by a decrement step size until a lower quality report threshold limit is reached.

14. The wireless terminal of claim 13, wherein the current quality report comprises a current BEP report; the estimated quality report comprises an estimated BEP derived from SNR; the quality report threshold comprises a Re-encoded Bit Error Rate (RBER) threshold; and the measured quality report comprises a RBER based on re-encoding the data block.

15. The wireless terminal of claim 14, wherein an updated quality report to be sent to the network is determined based upon both the estimated quality report and at least one prior quality report.

16. The wireless terminal of claim 15, wherein the weighted sum of the estimated quality report and quality report threshold is based on a channel quality measure.

17. The wireless terminal of claim 16, wherein the increment step size and decrement step size are based on a channel quality measure.

18. The wireless terminal of claim 17, wherein channel quality measure comprises a block error report (BLER).

19. The wireless terminal of claim 17, wherein the RBER is determined based upon re-encoded data and soft decisions of the data block.

20. The wireless terminal of claim 17, wherein the transmission scheme comprises:
a coding scheme; and
a modulation format.

21. The wireless terminal of claim 20, wherein the SNR maps to the estimated BEP based on the modulation format of the RF bursts.

22. The wireless terminal of claim 20, wherein the modulation format of the RF burst is GMSK or 8PSK.

23. The wireless terminal of claim 20, wherein the RBER threshold is based on a Modulation and Coding Scheme of the RF bursts.

24. The wireless terminal of claim 14, wherein the wireless terminal operates according to the GSM standard.

25. The wireless terminal of claim 14, wherein the wireless terminal provides the averaged BEP to a servicing base station, and wherein the servicing base station selects a transmission scheme for the RF bursts based on the updated BEP.

26. A method to determine a reported bit error probability (BEP) for radio frequency (RF) bursts transmitted from a servicing base station to a wireless terminal in a cellular wireless communication system, the method comprising:
receiving the RF bursts by the wireless terminal wherein the RF bursts are transmitted according to a transmission scheme;
forming a data block from the RF bursts;
decoding the data block;
determining whether decoding of the data block was successful;
determining a current BEP for the data block;
when decoding is unsuccessful, setting the reported BEP to a maximum of the estimated BEP and a Re-encoded Bit Error Rate (RBER) threshold, and further incrementing the RBER threshold by a increment step size until an upper quality report threshold limit is reached; and when decoding is successful, setting the reported BEP to the RBER and decrementing the RBER threshold by a decrement step size until a lower quality report threshold limit is reached.

27. The method of claim 26, wherein an updated BEP reported to the servicing base station is determined based upon both the current data block and at least one prior data block.

28. The method of claim 27, wherein the wireless terminal determines the estimated BEP based on the SNR of the RF bursts when the data within the data block decodes unsuccessfully.

29. The method of claim 28, wherein the SNR is derived from training sequences of the RF bursts.

30. The method of claim 28, wherein the RBER is determined based upon re-encoded data and soft decisions of the data block.

31. The method of claim 28, wherein the transmission scheme comprises:
a coding scheme; and
a modulation format.

32. The method of claim 31, wherein the SNR maps to the estimated BEP based upon the modulation scheme of the RF burst.

33. The method of claim 31, wherein the modulation format of the RF burst is GMSK or 8PSK.

34. The method of claim 31, wherein an initial RBER threshold is based on a Modulation and Coding Scheme of the RF bursts.

35. The method of claim 26, wherein the wireless terminal operates according to the GSM standard.

36. The method of claim 26, further comprising the servicing base station selecting a transmission scheme for the wireless terminal using the updated BEP.

* * * * *